United States Patent [19]

Miyaoh et al.

[11] Patent Number: 5,280,929
[45] Date of Patent: Jan. 25, 1994

[54] STEEL LAMINATE GASKET WITH REDUCED HOLE

[75] Inventors: Yoshio Miyaoh, Tokyo; Yoshio Yamada, Koshigaya, both of Japan

[73] Assignee: Ishikawa Gasket Co., Ltd., Tokyo, Japan

[21] Appl. No.: 908,433

[22] Filed: Jun. 30, 1992

Related U.S. Application Data

[62] Division of Ser. No. 340,646, Apr. 20, 1989, abandoned.

[30] Foreign Application Priority Data

Apr. 22, 1988 [JP]   Japan ............................. 63-53532[U]
Aug. 23, 1988 [JP]   Japan ........................... 63-109644[U]

[51] Int. Cl.⁵ ................................................ F16J 15/08
[52] U.S. Cl. .................................................. 277/235 B
[58] Field of Search ............... 277/233, 235 A, 235 B, 277/236

[56] References Cited

U.S. PATENT DOCUMENTS

| | | | |
|---|---|---|---|
| 2,188,876 | 1/1940 | Fahlman | 277/235 B |
| 4,317,576 | 3/1982 | Barker et al. | 277/235 B |
| 4,471,968 | 9/1984 | Schlaupitz et al. | 277/235 B |
| 4,619,459 | 10/1986 | Herrington | 277/235 B |
| 4,653,761 | 3/1987 | Baugh et al. | 277/235 B |
| 4,711,456 | 12/1987 | Udagawa | 277/235 B |
| 4,714,260 | 12/1987 | Udagawa | 277/235 B |
| 4,728,110 | 3/1988 | Nakasone | 277/235 X |
| 4,739,999 | 4/1988 | Ishii et al. | 277/235 B |
| 4,759,585 | 7/1988 | Udagawa | 277/235 B |
| 4,767,124 | 8/1988 | Udagawa | 277/235 B |
| 4,807,892 | 2/1989 | Udagawa | 277/235 B |
| 4,822,062 | 4/1989 | Gallo et al. | 277/235 A X |
| 4,826,708 | 5/1989 | Udagawa | 277/235 B X |
| 4,861,046 | 8/1989 | Udagawa | 277/235 B |

FOREIGN PATENT DOCUMENTS 2241025 8/1991 United Kingdom ............ 277/235 B

OTHER PUBLICATIONS

Cherry Steel Laminate Gasket Technical Report; Ishikawa Gasket Co. Ltd.; 1979.

*Primary Examiner*—William A. Cuchlinski, Jr.
*Assistant Examiner*—Scott W. Cummings
*Attorney, Agent, or Firm*—Kanesaka and Takeuchi

[57] ABSTRACT

A steel laminate gasket of the present invention is installed between two engine parts having at least one fluid hole. The gasket comprises a first plate having at least one first hole, a second plate situated above the first plate and having at least one second hole, at least one third plate situated above the second plate and having at least one third hole, and a cover member for covering at least first and third holes. The size of the first hole is smaller than the fluid hole of the engine parts to restrict flow rate of fluid passing therethrough. The second plate is provided with a first sealing device situated around the fluid hole such that the first sealing device is sandwiched between the two engine parts. The size of the second hole is smaller than the first sealing device. The size of the third hole is substantially the same as that of the first hole. The third plate is provided with a stepped portion, which is located inside the first sealing device when the plates are assembled together.

12 Claims, 2 Drawing Sheets

STEEL LAMINATE GASKET WITH REDUCED HOLE

This application is a division of application Ser. No. 340,646, filed Apr. 20, 1989 abandoned.

BACKGROUND OF THE INVENTION AND RELATED ART STATEMENT

The present invention relates to a steel laminate gasket with a reduced hole for regulating flow rate of fluid passing therethrough.

In an internal combustion engine, there are provided with fluid passages for water and oil. In particular, the water and oil passages are formed inside a cylinder block and cylinder head, and when the engine is assembled together, water and oil circulate through the respective passages in the cylinder block and cylinder head. When the cylinder block and cylinder head are assembled, a gasket is installed therebetween to prevent leakage of fluid at a connecting portion.

In an automobile industry, one engine is installed in different models of cars to reduce manufacturing cost of an engine. In this case, cylinder block and cylinder head in one engine are manufactured in the same manner. Although the engine is the same, installation condition is different in each model of the cars. Therefore, small design changes of an engine are required in each model. For example, amounts of cooling water and oil circulating through the engine and distribution rates of cooling water and oil inside an engine may be changed in each model.

The cylinder head and cylinder block are made of cast metal. Therefore, the cylinder head and cylinder block are not changed, and instead, a gasket situated between the cylinder head and cylinder block is changed. For example, in case the cylinder head and cylinder block are provided with a large water hole, a small hole is formed in the gasket to reduce flow rate of water. In some cases, water holes in the cylinder block and cylinder head are entirely closed by the gasket.

A steel laminate gasket is formed of a plurality of thin steel plates. In case the size of the water hole is reduced in a steel laminate gasket, at least one of the steel plates must extend into a water hole. As a result, these arises some technical problems. Namely, in case one plate extends into the water hole, since the plate is very thin, the plate may bend by pressure of flowing water to thereby reduce sealing ability. In case some of the steel plates extend into a water hole, water enters into spaces between the plates. In a steel laminate gasket, it is very difficult to seal around fluid holes especially in case the gasket partly extends into a fluid hole.

Accordingly, one object of the present invention is to provide a steel laminate gasket having a reduced fluid hole, wherein leakage of fluid is substantially prevented.

Another object of the invention is to provide a steel laminate gasket as stated above, wherein deformation of the steel plate due to fluid flow is substantially prevented.

A further object of the invention is to provide a steel laminate gasket as stated above, which can be used for a long period of time.

Further objects and advantages of the invention will be apparent from the following description of the invention.

SUMMARY OF THE INVENTION

In accordance with the present invention, a steel laminate gasket is installed between two engine parts of an internal combustion engine having at least one fluid hole therein. The gasket comprises a first plate having at least one first hole, a second plate situated above the first plate and having at least one second hole, at least one third plate situated above the second plate and having at least one third hole, and a cover member for covering at least first and third holes.

The size of the first hole is smaller than the fluid hole of the engine parts to restrict flow rate of the fluid passing through the fluid hole. The second plate is provided with first sealing means situated around the fluid hole such that the first sealing means is sandwiched between the two engine parts. The size of the second hole is smaller than that of the first sealing means. The size of the third hole substantially corresponds to that of the first hole. Also, the third plate includes a first area located inside the fluid hole, a stepped portion disposed outside the first area to surround the same and a second area disposed outside the stepped portion. The first sealing means is located under the second area.

The stepped portion is located between the two engine parts when the gasket is installed in the engine. When the engine parts are tightened, the stepped portion deforms to securely seal between the two engine parts. Namely, the stepped portion forms an auxiliary sealing means. Also, the rigidity of the first area of the third plate is increased by the stepped portion. As a result, the third plate together with the first plate do not substantially bend or deform by fluid circulating through the engine. The sealing ability does not decrease.

The cover member may be a grommet, wherein a curved portion is situated inside the first and third holes, and flanges are situated outside the first and third plates, respectively. On the other hand, the cover member may be integrally formed with one of the first and third plates, wherein the cover member is turned to be located on the other of the first and third plates. The cover member covers holes of the plates situated in the fluid hole to prevent fluid from entering into spaces between the plates. In this respect, a coating may be partially formed on a plate where the cover member contacts, so that sealing ability between the plate and cover member is increased.

The third plate may have a size to extend substantially throughout the entire area of the gasket. On the other hand, the third plate may extend to surround the fluid hole for covering only the first sealing means. Even if the third plate does not extend throughout the entire area of the gasket, the gasket operates as intended.

The first plate may have a bead which extends around the first hole and is covered by the cover member. When the cover member is tightened, the bead is compressed to thereby securely seal around the fluid hole.

DETAILED DESCRIPTION OF PREFERRED EMBODIMENTS

Figure 1:
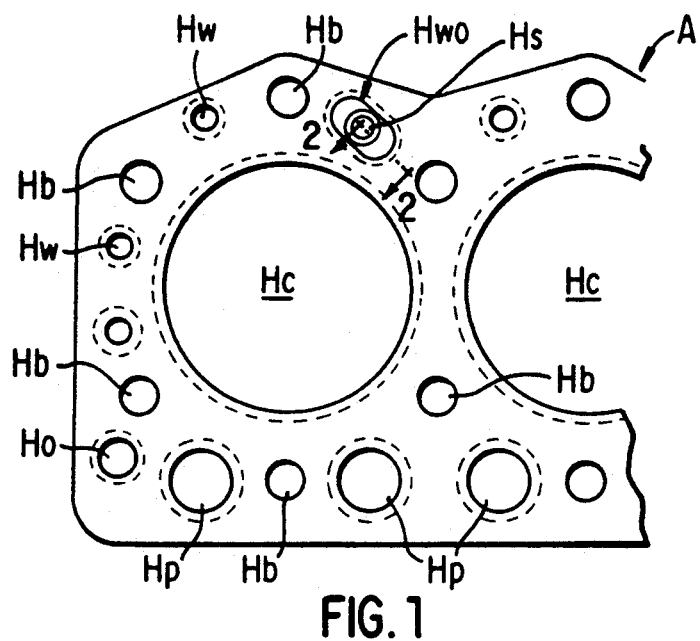
FIG. 1 is a partial plan view of a first embodiment of a steel laminate gasket of the present invention.
Figure 2:
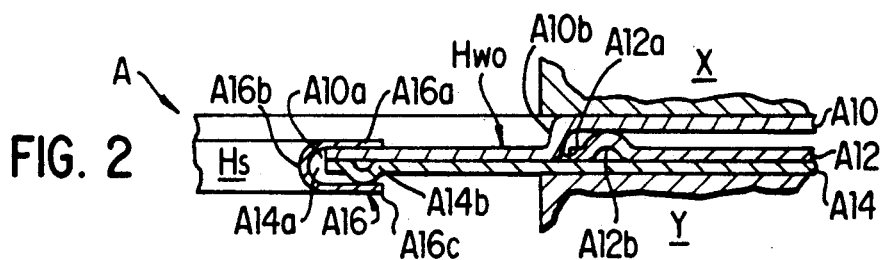
FIG. 2 is an enlarged explanatory section view taken along line 2—2 in FIG. 1.

Referring to FIGS. 1 and 2, a first embodiment A of a steel laminate gasket of the invention is shown. The gasket A is a cylinder head gasket and is provided with cylinder holes Hc, water holes Hw, oil holes Ho, bolt holes Hb, and push rod holes Hp, as in the conventional gasket. The cylinder holes Hc, water holes Hw, oil holes Ho and push rod holes Hp are surrounded by sealing devices to seal therearound. The sealing devices may be any kind of devices, such as beads, which are shown in dot lines in FIG. 1. Since the sealing device is not a subject matter of the present invention, further explanation of the seal device is omitted.

The gasket A is further provided with a water flow restricting portion Hwo, which restricts water flow rate flowing through an engine. Namely, the cylinder head and cylinder block are provided with large elongated water holes substantially corresponding to the water flow restricting portion Hwo, but the restricting portion Hwo is provided with a water hole Hs smaller than the water holes of the cylinder head and cylinder block. Water flowing through the large water hole is, therefore, restricted by the water hole Hs. Consequently, the cooling condition of the engine is regulated.

As shown in FIG. 2, the gasket A comprises an upper plate A10, an inner plate A12, and a lower plate A14. The upper plate A10 is provided with a hole A10a slightly larger than the water hole Hs, and a stepped portion A10b extending around the water flow restricting portion Hwo. The inner plate A12 is provided with a hole A12a slightly larger than the restricting portion Hwo, and a bead A12b extending around the hole A12a. The lower plate A14 is provided with a hole A14a having a size equal to that of the hole A10a, and a bead A14b extending around the hole A14a.

The gasket A further comprises a grommet A16 to define the water hole Hs. The grommet A16 includes an upper flange A16a situated above the upper plate A10, a curved portion A16b located in the holes A10a, A14a, and a lower flange A16c situated under the bead A14b. The curved portion A16b defines the water hole Hs.

When the gasket A is assembled, the inner plate A12 is situated between the upper and lower plates A10, A14 such that the bead A12b is located outside the stepped portion A10b. Therefore, parts of the upper and lower plates A10, A14 form water flow restricting portion Hwo. The grommet A16 is situated inside the holes A10a, A14a. When the grommet A16 is fixed to the upper and lower plates A10, A14, the bead A14b is slightly compressed to securely seal between the upper and lower plates A10, A14 around the water hole Hs.

When the gasket A is situated between a cylinder head X and a cylinder block Y, the stepped portion A10b is located between the cylinder head X and the cylinder block Y. When the gasket A is tightened, the stepped portion A10b and the bead A12b deform to securely seal around the water flow restricting portion Hwo. Namely, the bead A12b, when compressed, forms a plurality of corrugated beads to seal around the restriction portion Hwo. The stepped portion A10b enhances the sealing ability. Water does not substantially enter between the cylinder head X and cylinder block Y.

In the gasket A, the water flow restricting portion Hwo is surrounded by the stepped portion A10b. Therefore, the rigidity of the upper plate A10 inside the restricting portion Hwo is increased. The grommet A16 also enhances the rigidity of the restricting portion Hwo. As a result, although water flow is restricted at the restricting portion Hwo, the restriction portion Hwo does not deform or bend. Water does not substantially enter between the upper and lower plates A10, A14 by means of the grommet A16.

In this respect, if the restricting portion Hwo bends, the sealing ability around the restricting portion Hwo is impaired. As a result, water enters into spaces between the cylinder head and cylinder block.

In the gasket A, the rigidity at the water flow restricting portion Hwo is strong, while the respective plates possess compressibility or elasticity to provide sealing ability when beads are formed. Therefore, the gasket can securely seal around holes of the gasket.

Figure 3:
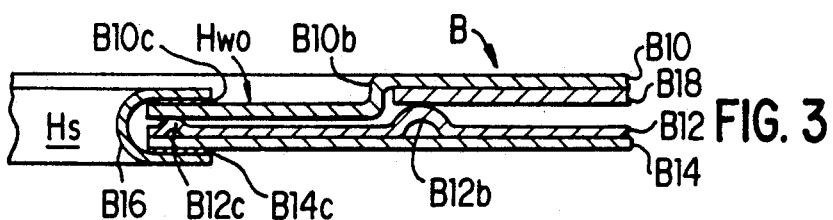
FIGS. 3–8 are section views, similar to FIG. 2, for showing second to seventh embodiments of the invention.

FIG. 3 shows a second embodiment B of a steel laminate gasket of the present invention. The gasket B comprises an upper plate B10 with a stepped portion B10b, an inner plate B12, a lower plate B14 and a grommet B16, as in the gasket A. However, the inner plate B12 extends inside the water flow restricting portion Hwo, and is provided with a bead B12c around the water hole Hs in addition to a bead B12b situated outside the stepped portion B10b. The lower plate B14 does not have a bead around the water hole Hs.

Also, the gasket B includes an inner plate B18 under the upper plate B10 outside the stepped portion B10b. Further, coatings B10c, B14c, such as silicone rubber or fluorine-contained rubber, are formed on the outsides of the upper and lower plates B10, B14 where the grommet B16 contacts. As a result, sealing ability at the grommet B16 is further improved.

In the gasket B, the bead B12c and coatings B10c, B14c together with the grommet B16 seal around the water hole Hs. The bead B12b and the stepped portion B10b seal around the water flow restricting portion Hwo. The gasket B operates as in the gasket A.

Figure 4:
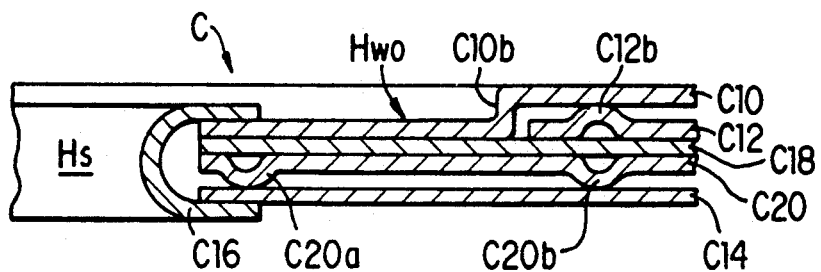

FIG. 4 shows a third embodiment C of a steel laminate gasket of the present invention. The gasket C comprises an upper plate C10 with a stepped portion C10b, an inner plate C12 with a bead C12b, a lower plate C14, and a grommet C16, as in the gasket A. However, the gasket C further includes inner plates C18, C20 having sizes similar to the lower plate C14. The inner plate C20 is provided with a bead C20a around the water hole Hs, and a bead C20b located under the bead C12b.

In the gasket C, the bead C20a together with the grommet C16 seals around the water hole Hs. The beads C12b, C20b and the stepped portion C10b seal around the water flow restriction portion Hwo. The gasket C is suitable for an engine which requires thick gasket.

Figure 5:
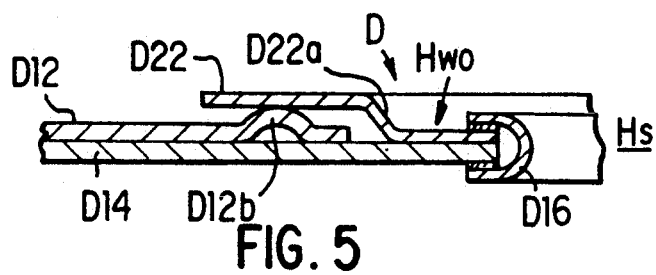

FIG. 5 shows a fourth embodiment D of a steel laminate gasket of the present invention. The gasket D comprises a plate D22 with a stepped portion D22a, a plate D12 with a bead D12b, a lower plate D14, and a grommet D16, similar to the gasket A. In the gasket A, the plate A10 extends throughout the gasket A, but in the gasket D, the plate D22 does not extend the entire area of the gasket. The plate D22 terminates just outside the bead D12b. Also, there is no bead around the water hole Hs.

In the gasket D, however, the grommet D16 seals between the plates D12 and D14. Since the stepped portion D22a is located outside the water flow restricting portion Hwo, when the gasket D is tightened, the stepped portion D22a and the bead D12b seal around the water flow restricting portion Hwo. The stepped portion D22a and the grommet D16 assure that the plates D22, D14 do not bend or deform in use. Therefore, the gasket D operates as in the gasket A.

Figure 6:
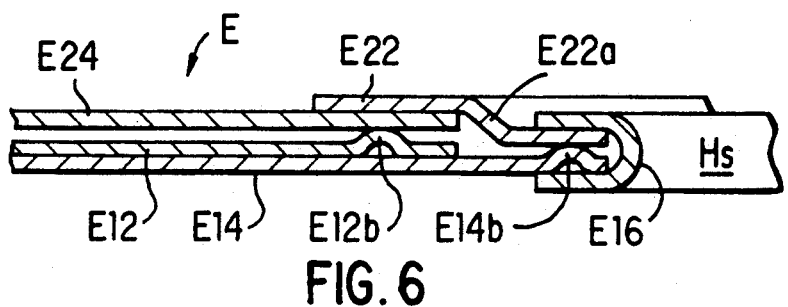

FIG. 6 shows a fifth embodiment E of a steel laminate gasket of the present invention. The gasket E comprises a plate E22 with a stepped portion E22a, a plate E12 with a bead E12b, a plate E14, and a grommet E16, similar to the gasket D. However, a plate E24 is situated above the plate E12, and the plate E14 is provided with a bead E14b around the water hole Hs. The bead E14b together with the grommet E16 seals around the water hole Hs. The gasket E operates as in the gasket D.

Figure 7:
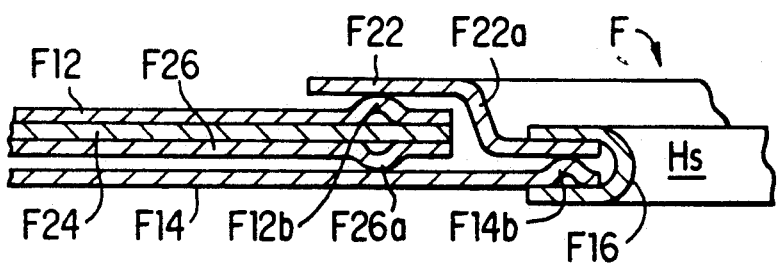

FIG. 7 shows a sixth embodiment F of a steel laminate gasket of the present invention. The gasket F comprises a plate F22 with a stepped portion F22a, a plate F12 with a bead F12b, a plate F14 with a bead F14b and a grommet F16, similar to the gasket E. However, the gasket F furtehr includes a plate F24 and a plate F26 with a bead F26a. The gasket F operates as in the gasket D. However, the gasket F is used in case a thick gasket is required.

Figure 8:
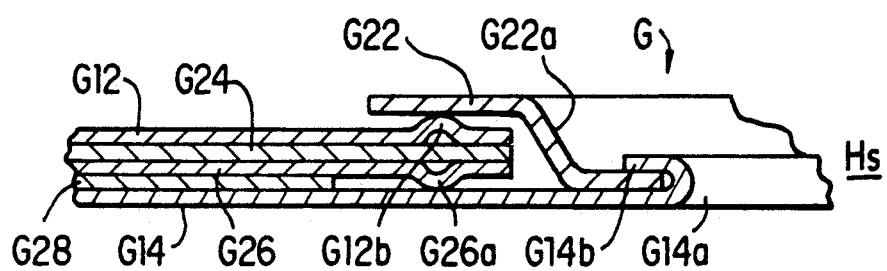

FIG. 8 shows a seventh embodiment G of a steel laminate gasket of the present invention. The gasket G comprises a plate G22 with a stepped portion G22a, a plate G12 with a bead G12b, a plate G24, a plate G26 with a bead G26a, and a plate G14, as in the gasket F. However, the gasket G further includes a pressure regulation plate G28 between the plates G26, G14, which regulates pressure applied to the beads G12b, G26a when the gasket G is tightened. Also, the plate G14 is provided with a curved portion G14a adjacent the water hole Hs, and a flange G14b situated above the plate G22, instead of a grommet. The curved portion G14a and flange G14b prevent water from entering into the space between the plates G22, G14. The gasket G is used in case a thick gasket is required, as in the gasket F.

In the steel laminate gasket of the invention, some of the plates extend into a fluid hole of an engine to control flow rate of the fluid, wherein the extended ends of the plates are covered by a grommet or curved portion to prevent fluid from entering between the plates. Also, one of the plates extended into the fluid hole includes a stepped portion, which operates to securely seal between the cylinder head and cylinder block. The stepped portion and the grommet or curved portion assure that the portion of the gasket extended into the fluid hole does not bend or deform by fluid flowing through the fluid hole. Therefore, the steel plates can be made of a material such that the bead, when formed, have sufficient resiliency. Namely, even if the steel plates are made of thin plates to have resiliency, the plates in the fluid hole do not deform, and the gasket can securely seal around the fluid hole.

While the invention has been explained with reference to the specific embodiments of the invention, the explanation is illustrative and the invention is limited only by the appended claims

What is claimed is:

1. A steel laminate gasket adapted to be installed between two engine parts of an internal combustion engine, said engine having at least one fluid hole therein, comprising:
    a first metal plate having at least one first hole, said first hole having a size smaller than the fluid hole of the engine parts to restrict flow rate of fluid passing therethrough,
    a second metal plate situated above the first plate and including first sealing means situated around the fluid hole such that the first sealing means is sandwiched between the two engine parts, and at least one second hole situated inside the first sealing means,
    at least one third metal plate situated above a portion around the first hole of the first plate inside the fluid hole and above a portion around the second hole of the second plate without extending outwardly substantially beyond the portion around the second hole, said third plate including a third hole having a size substantially corresponding to that of the first hole, a first area located inside the fluid hole, a stepped portion disposed outside the first area to surround the same, said stepped portion being located between the two engine parts so that when the gasket is tightened, the stepped portion deforms to securely seal around the first area and to increase rigidity of the first area, and a second area disposed outside the stepped portion so that the first sealing means is located under the second area, and
    at least one cover member situated inside the fluid hole for covering at least first and third holes to prevent fluid from entering into a space between the first and third plates, said cover member stiffening the first and third plates around the first and third holes to prevent deformation of the plates.

2. A steel laminate gasket according to claim 1, wherein said stepped portion is located between the two engine parts so that when the two engine parts are tightened together, said stepped portion deforms to securely seal between the two engine parts.

3. A steel laminate gasket according to claim 2, further comprising a coating formed on an inner side of the cover member, or outside of the first and third plates where the cover member contacts to prevent fluid from entering inside the cover member.

4. A steel laminate gasket according to claim 3, wherein said cover member is a grommet having a curved portion situated inside the first and third holes, and flanges situated outside the first and third plates respectively.

5. A steel laminate gasket according to claim 1, wherein said first plate further includes a bead around the first hole adjacent thereto to securely seal between the first and third plates when the first and third plates are tightened by means of a grommet.

6. A steel laminate gasket according to claim 5, further comprising a fourth plate having a size corresponding to the second plate, said fourth plate being situated above the second plate.

7. A steel laminate gasket according to claim 6, further comprising fourth and fifth plates having sizes corresponding to the second plate, said fourth plate being situated under the second plate, said fifth plate having second sealing means corresponding to the first sealing means and being situated under the fourth plate.

8. A steel laminate gasket according to claim 3, wherein said cover member is integrally formed with the first plate and includes a curved portion extending upwardly from the first plate and a flange situated above the third plate to thereby prevent fluid from entering into spaces between the first and third plates.

9. A steel laminate gasket according to claim 8, further comprising fourth and fifth plates having sizes corresponding to the second plate, said fourth plate being situated under the second plate, said fifth plate having second sealing means and being situated under the fourth plate, and a pressure regulation plate situated under the fifth plate outside the second sealing means relative to the first hole.

10. A steel laminate gasket adapted to be installed between two engine parts of an internal combustion engine, said engine having at least one fluid hole therein, comprising:
- a first metal plate having at least one first hole, said first hole having a size smaller than the fluid hole of the engine parts to restrict flow rate of fluid passing therethrough, and a bead around the first hole to surround the same,
- a second metal plate situated above the first plate and including first sealing means situated around the fluid hole such that the first sealing means is sandwiched between the two engine parts, and at least one second hole situated inside the first sealing means,
- at least one third metal plate situated above a portion around the first hole of the first plate inside the fluid hole and above a portion around the second hole of the second plate without extending outwardly substantially beyond the portion around the second hole, said third plate including a third hole having a size substantially corresponding to that of the first hole, a first area located inside the fluid hole, a stepped portion disposed outside the first area to surround the same, said stepped portion being located inside the second hole of the second plate and sandwiched between the two engine parts so that when the gasket is tightened, the stepped portion deforms to securely seal around the first area and to increase rigidity of the first area, and a second area disposed outside the stepped portion so that the first sealing means is located under the second area, said first sealing means together with the stepped portion deforming between the two engine parts to seal around the fluid hole when the gasket is tightened, and
- at least one cover member situated inside the fluid hole for covering at least first and third holes to prevent fluid from entering into a space between the first and third plates, said bead on the first plate being situated inside the cover member so that when the cover member is assembled with the first and third plates, the bead is compressed by the cover member to thereby securely seal the plates retained between the cover member.

11. A combination of an internal combustion engine and a steel laminate gasket to be installed in the engine, comprising:
- said engine including two engine parts and at least one fluid hole therein; and
- said gasket being installed between the two engine parts and including;
- a first metal plate having at least one first hole, said first hole having a size smaller than the fluid hole of the engine parts to restrict flow rate of fluid passing therethrough,
- a second metal plate situated above the first plate and including at least one first sealing means situated around the fluid hole such that the first sealing means is sandwiched between the two engine parts when installed in the engine, and at least one second hole situated inside the first sealing means,
- at least one third metal plate situated above a portion around the first hole of the first plate inside the fluid hole and above a portion around the second hole of the second plate without extending outwardly substantially beyond the portion around the second hole, said third plate including a third hole having a size substantially corresponding to that of the first hole, a first area located inside the fluid hole when installed in the engine, a stepped portion disposed outside the first area to surround the same, said stepped portion being located inside the second hole of the second plate and sandwiched between the two engine parts when installed in the engine so that when the gasket is tightened, the stepped portion deforms to securely seal around the first area and to increase rigidity of the first area, and at least one second area disposed outside the stepped portion so that the first sealing means is located under the second area, said first sealing means together with the stepped portion deforming between the two engine parts to seal around the fluid hole when the gasket is tightened, and
- at least one cover member situated inside the fluid hole for covering at least first and third holes to prevent fluid from entering into a space between the first and third plates, said cover member stiffening the first and third plates around the first and third holes to prevent deformation of the plates.

12. A combination according to claim 11, wherein said first plate further includes a bead around the first hole to surround the same, said bead on the first plate being situated inside the cover member so that when the cover member is assembled with the first and third plates, the bead is compressed by the cover member to thereby securely seal the plates retained by the cover member.

* * * * *

UNITED STATES PATENT AND TRADEMARK OFFICE
CERTIFICATE OF CORRECTION

PATENT NO. : 5,280,929
DATED : January 25, 1994
INVENTOR(S) : Yoshio Yamada

It is certified that error appears in the above-identified patent and that said Letters Patent is hereby corrected as shown below:

Cover page, Inventor's name of the patent under the heading of United States Patent (19), change "Miyaoh et al." to --Yamada--.

Cover page, Inventor's section, correct "Yoshio Miyaoh, Tokyo; Yoshio Yamada, Koshigaya, both of Japan" to --Yoshio Yamada, Koshigaya, Japan--.

Cover page, Foreign Application Priority Data's section, delete "Apr. 22, 1988 (JP) Japan........63-53532(U)"

Column 6, line 54, change "6" to --5--.

Signed and Sealed this

Fifth Day of July, 1994

Attest:

BRUCE LEHMAN

Attesting Officer   Commissioner of Patents and Trademarks